US008601391B2

(12) United States Patent
Jezek, Jr.

(10) Patent No.: US 8,601,391 B2
(45) Date of Patent: *Dec. 3, 2013

(54) DYNAMIC FUNCTIONALITY BASED ON WINDOW CHARACTERISTICS

(75) Inventor: Raymond J. Jezek, Jr., Elgin, IL (US)

(73) Assignee: Trading Technologies International, Inc., Chicago, IL (US)

( * ) Notice: Subject to any disclaimer, the term of this patent is extended or adjusted under 35 U.S.C. 154(b) by 303 days.

This patent is subject to a terminal disclaimer.

(21) Appl. No.: 13/090,067

(22) Filed: Apr. 19, 2011

(65) Prior Publication Data

US 2011/0196812 A1   Aug. 11, 2011

Related U.S. Application Data

(63) Continuation of application No. 11/840,738, filed on Aug. 17, 2007, now Pat. No. 7,949,954.

(51) Int. Cl.
*G06F 3/048* (2013.01)

(52) U.S. Cl.
USPC .............. 715/800; 715/798; 715/801; 705/37

(58) Field of Classification Search
USPC ................ 715/798, 800, 801; 705/37
See application file for complete search history.

(56) References Cited

U.S. PATENT DOCUMENTS

| | | | | |
|---|---|---|---|---|
| 5,227,771 A * | 7/1993 | Kerr et al. | ...................... | 715/800 |
| 5,751,283 A * | 5/1998 | Smith | ........................... | 715/798 |
| 5,815,151 A * | 9/1998 | Argiolas | ....................... | 715/800 |
| 5,847,706 A * | 12/1998 | Kingsley | ....................... | 715/788 |
| 6,008,809 A * | 12/1999 | Brooks | .......................... | 715/792 |
| 6,414,698 B1 * | 7/2002 | Lovell et al. | .................. | 715/800 |
| 6,766,304 B2 | 7/2004 | Kemp, II et al. | | |
| 6,772,132 B1 | 8/2004 | Kemp, II et al. | | |
| 2002/0059129 A1 * | 5/2002 | Kemp et al. | ...................... | 705/37 |
| 2002/0186257 A1 * | 12/2002 | Cadiz et al. | ................... | 345/838 |
| 2003/0011639 A1 * | 1/2003 | Webb | ............................. | 345/808 |
| 2003/0035011 A1 * | 2/2003 | Lee et al. | ....................... | 345/780 |
| 2003/0107604 A1 * | 6/2003 | Ording | .......................... | 345/788 |
| 2004/0212640 A1 * | 10/2004 | Mann et al. | .................... | 345/792 |
| 2004/0268263 A1 * | 12/2004 | Van Dok et al. | ............. | 715/733 |
| 2005/0044058 A1 * | 2/2005 | Matthews et al. | ................ | 707/1 |
| 2005/0177798 A1 * | 8/2005 | Thomson et al. | ............. | 715/788 |
| 2006/0129475 A1 * | 6/2006 | Badenhorst et al. | ............ | 705/37 |
| 2006/0236264 A1 * | 10/2006 | Cain et al. | ..................... | 715/788 |
| 2006/0271887 A1 * | 11/2006 | Bier et al. | ...................... | 715/866 |
| 2007/0136685 A1 * | 6/2007 | Bhatla et al. | .................. | 715/800 |
| 2007/0157160 A1 * | 7/2007 | Arend et al. | ................... | 717/105 |
| 2007/0288863 A1 * | 12/2007 | Ording et al. | ................. | 715/788 |
| 2008/0052637 A1 * | 2/2008 | Ben-Yoseph et al. | ......... | 715/800 |

OTHER PUBLICATIONS

Unpublished U.S. Appl. No. 11/840,738, filed on Aug. 17, 2007, with inventor Raymond J. Jezek, entitled "Dynamic Functionality Based on Window Characteristics,".

* cited by examiner

*Primary Examiner* — Tuyetlien Tran
(74) *Attorney, Agent, or Firm* — McDonnell Boehnen Hulbert & Berghoff LLP

(57) ABSTRACT

A system and method are described for changing window's functionality upon detecting resizing events. According to one example method, a plurality of size thresholds is defined that are associated with a plurality of functional states for a window. Upon detecting that a size of a window reaches a first size threshold, a first functional state is applied to a window. Then, upon detecting another size threshold as the window is being increased or decreased in size, another functional state associated with the detected threshold is applied to the window.

30 Claims, 6 Drawing Sheets

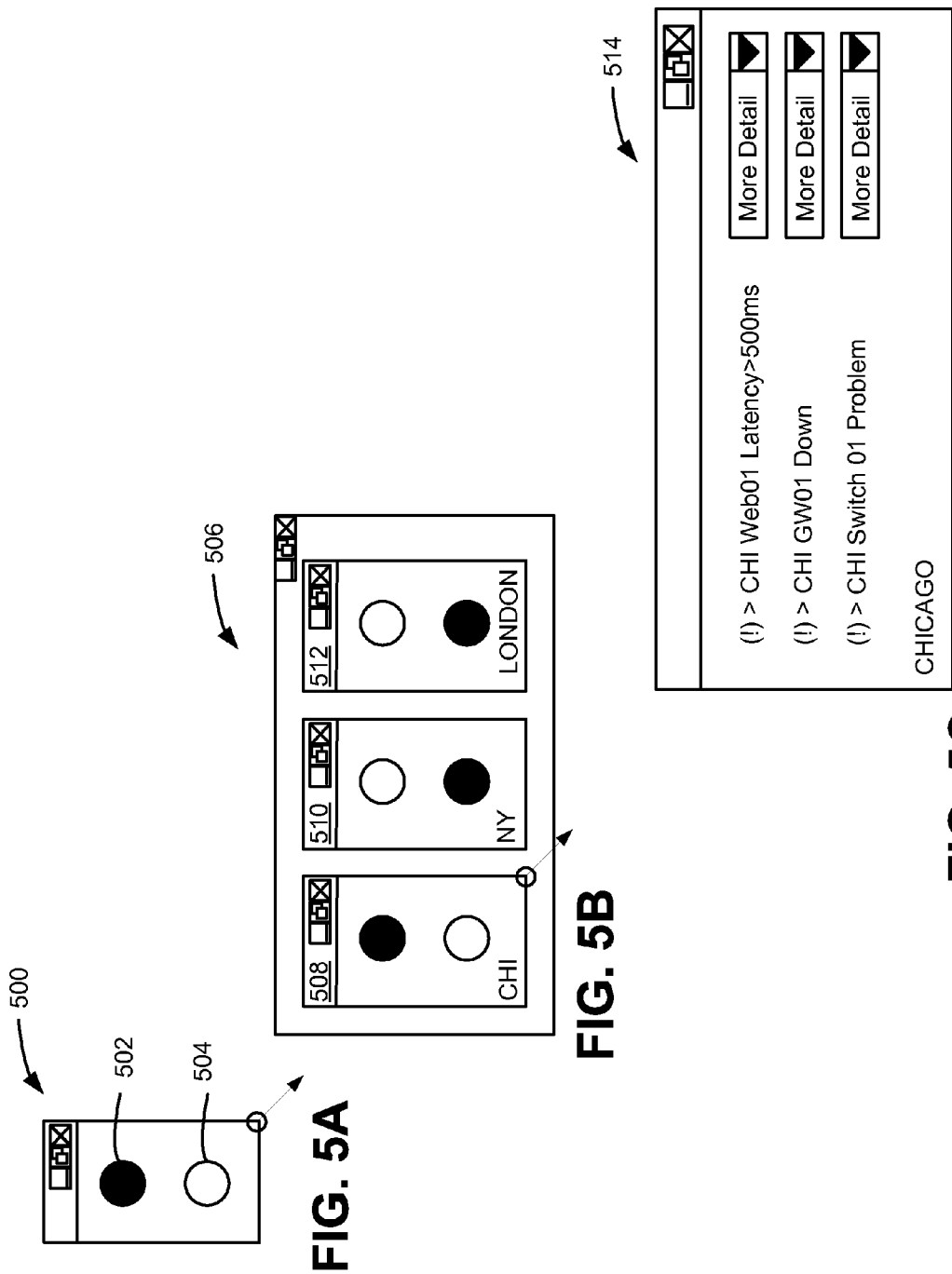

DYNAMIC FUNCTIONALITY BASED ON WINDOW CHARACTERISTICS

CROSS REFERENCE TO RELATED APPLICATIONS

This application is a continuation of U.S. patent application Ser. No. 11/840,738, filed Aug. 17, 2007, now U.S. Pat. No. 7,949,954, entitled "Dynamic Functionality Based on Window Characteristics," the contents of which are fully incorporated herein by reference.

TECHNICAL FIELD

The present invention is directed to a computer display system. More specifically, the present invention is directed to tools for dynamically changing functional states of a window based on the window's characteristics.

BACKGROUND

Many existing operating systems, such as the Microsoft Windows™ operating system, use graphical user interface (GUI) desktop environments to organize computer objects. A GUI allows a user to graphically view and manipulate the objects as icons using a mouse or a pointer. A GUI of the Microsoft Windows™ operating system is window-based. Microsoft Windows™ allows a user to have multiple applications active in multiple windows at the same time, each window having different functional characteristics.

A window, as used for example in the Microsoft Windows™ environment, specifies an area of a computer screen, typically rectangular in shape, which an application dedicates to a specific function. A window, by default, occupies a preselected area on a display as determined by an application that runs the window, however, the dimensions of the window can often be modified by a user. In the current window environments, a user may resize a window by dragging a window's vertical or horizontal border or a window's corner to a new position to modify the x-dimension, the y-dimension, or both x- and y-dimensions of the window, respectively.

Typically, as a window is being resized, the content of the window does not change, including the size of the font, icons and graphics. However, as the window is resized to a reduced area, the amount of visible content displayed may change such that the window displays only a portion of the original content that fits in the reduced area. Windows typically include scroll controls allowing a user to manipulate data displayed in window of a smaller size. By manipulating the scroll controls, a user may control which portion of the original content is displayed in the window at any point in time. Rather than providing only a portion of the original window's content when a window is resized, some applications re-scale the full original content of the window upon resizing of the window, thus allowing a user to view the full content without the need to use the scroll controls. This solution however has its drawbacks. For example, as a window is resized and the content is made smaller, the rescaled content may become too small to enable a user to effectively view and use it.

SUMMARY

According to example embodiments described herein, system and methods are provided for changing functionality provided by a window upon detecting a predetermined window size threshold. To illustrate the present invention and aspects thereof, the following description, including the figures and detailed description, provides examples that can be used or readily modified by one of ordinary skill to generate a system or method that benefits from the teachings described and claimed herein.

According to one example method, a plurality of size thresholds is defined along with a plurality of functional states to be used in relation to a window. According to one example embodiment, each functional state may be associated with a different display type and a different functional method for interacting with the displayed data. According to the example method, when a window has a first size that falls under the first size threshold, the first functional state is used in relation to the window. The first functional state is associated with a first display type that allows a user to interact with the displayed data according to a first functional method. Upon detecting that the window is resized such that the size of the window crosses another size threshold, another functional state associated with the controlling threshold is applied to the window. According to one example embodiment, the new functional state is configured to display the data via the window using a different display type that allows a user to interact with the displayed data using another functional method.

Other features of the present invention will become more apparent to persons having ordinary skill in the art to which the present invention pertains from the following description and claims.

BRIEF DESCRIPTION OF THE DRAWINGS

Example embodiments are described herein with reference to the following drawings, in which:

FIGS. 5A-5C illustrate an example of three sizing thresholds and the corresponding functionally different interfaces in a computer network management environment.

DETAILED DESCRIPTION

The present invention is related to dynamically changing functionality provided by a window when a manual or automatic resizing command is received in relation to the window and the window reaches a predetermined size threshold. One example embodiment for changing functionality of a window upon resizing is applied in an electronic trading network environment; however, as illustrated in relation to other embodiments, the present invention may be applied in other environments as well. To illustrate aspects of the present invention, a system and method are illustrated in example form using the drawings referred to herein. One of ordinary skill in the art will recognize, however, that such examples may be quickly and readily adaptable using the teachings described herein. Aspects of the present invention are protected by the accompanying claims. Limitations from the patent specification should not be improperly incorporated into the claims unless explicitly stated or otherwise inherently known.

I. Example Hardware System Configuration

Figure 1:
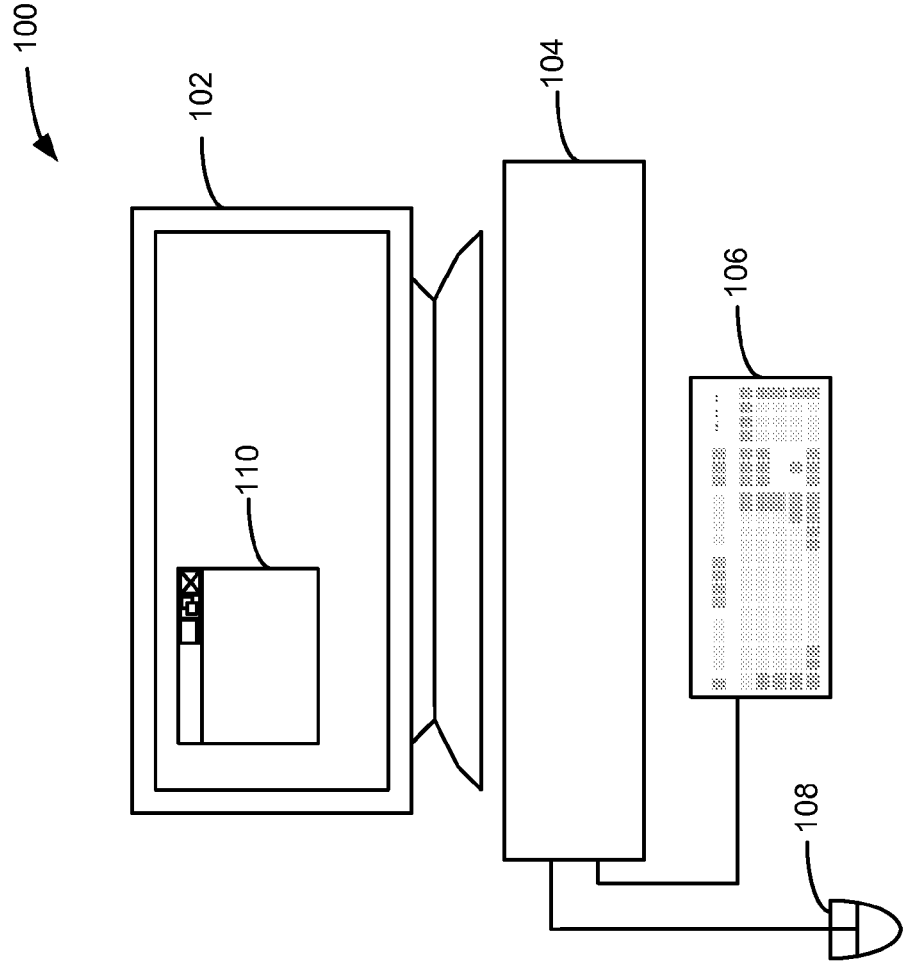
FIG. 1 is a block diagram illustrating a typical hardware system environment in which example embodiments are executed.

FIG. 1 illustrates an example hardware system environment 100 in which the example embodiments may be employed. The example system 100 includes a monitor 102 or any other data output device, a computer 104 which includes an attached keyboard 106, and a cursor placement device, such as a mouse 108. Monitor 102 displays multiple windows, such as an illustrated window 110. The computer 104 employed in the system 100 generally can range from a handheld device, laptop, or personal computer to a larger computer such as a workstation and multiprocessor. An illustrative personal computer may use Pentium™ microprocessors and may operate under a Microsoft Windows™ operating system, or yet may use some other microprocessor or operating system. It should be understood that the mouse 108 could be replaced with a touch screen, a joystick, or yet some other pointing device. One skilled in the art of computer systems will understand that the present example embodiments are not limited to any particular class or model of computer system employed and will be able to select an appropriate system.

It should be understood that the computer 104 includes a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, any other physical medium, memory chip or cartridge, or any other medium from which a computer can read.

II. Example Operation

According to the example embodiments, the functionality provided by a window changes in response to resizing events. More specifically, when predefined size-based thresholds are reached, the functionality provided via a window changes. For example, as a window's size is increased, more detailed view of data as well as different methods for user's interaction with the displayed data are provided in relation to the window as compared to the window having a smaller size. While the examples provided below describe size thresholds and activation of the size thresholds in a sequential manner, it should be understood that some functionality changes could be skipped as well when a user quickly resizes the window to a desired threshold size. Additionally, while the size triggers explained below focus on changing both x- and y-dimensions of a window, it should be understood that different functional stages can be activated upon detecting a change in only an x-dimension or a y-dimension of a window. For example, a desired functional state may be activated by only changing an x-dimension of a window. Additionally, the same desired functional state may be reached by changing both x- and y-dimensions of the window. In such an embodiment, an intermediate size threshold could be detected and a different functional state could be activated before reaching the threshold associated with the desired functional state. It should be understood that while the conventional windows are 2-dimensional, the example embodiments could easily be applied to 3-dimensional windows, i.e., windows having x-, y-, and z-dimensions. Those skilled in the art will understand that many different alternative embodiments are possible as well using the description provided herein.

Figure 2:
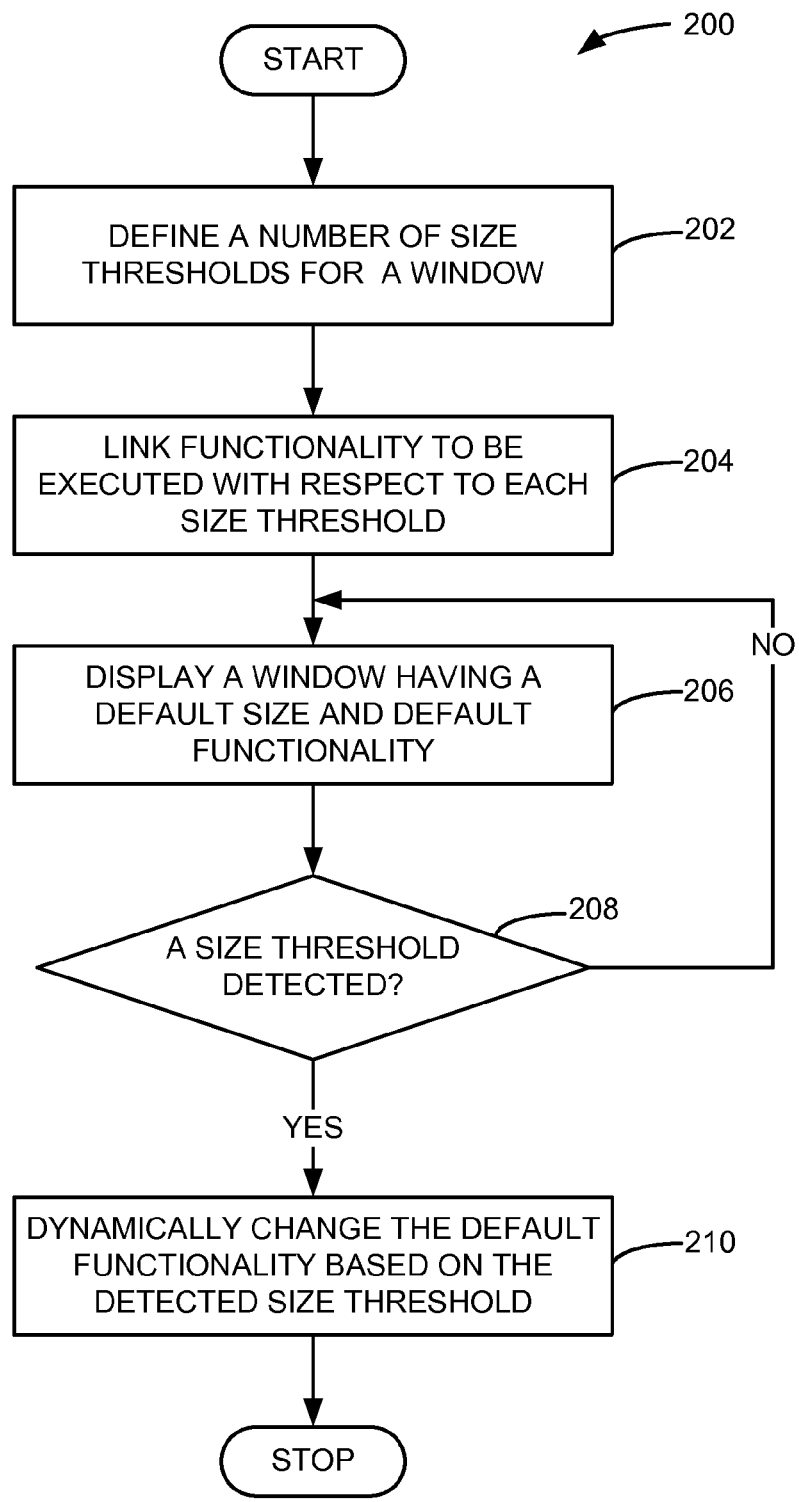
FIG. 2 is a flowchart illustrating an example method for dynamically changing functionality associated with a window as the window is being resized.

FIG. 2 is a flowchart illustrating an example method for dynamically changing functionality provided by a window upon detecting resizing events. It should be understood that the flowchart only shows the functionality and operation of a possible implementation of the present embodiments. In this regard, each block may represent a module, a segment, or a portion of the program code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

Referring now to FIG. 2, at 202, a number of size thresholds are defined with respect to a window associated with a standard state. A window at a standard state, as used herein, has a default size and functionality determined by an application that manages the window or by a user. The size thresholds define different sizes for the window using screen pixels or yet some other measurement standard. Alternatively, the size thresholds can be based on proportional changes with respect to the default size of the window. For example, a proportion-based threshold may define a window's size as twice as large as the default size. It should be understood that a user may pre-configure different size thresholds using many different standard interfaces. Alternatively, the size thresholds can be hardcoded.

It should be understood that only a few size thresholds are defined, and as long as a window's size falls between the defined thresholds, the controlling threshold, such as a smaller size threshold, is applied. For example, the first size threshold could be defined to correspond to a window's size of 100×200 pixels, and the second size threshold could correspond to the window's size of 100×300 pixels. In such an embodiment, as long as the window's size falls between the two defined thresholds, the first threshold controls. When the window's size reaches 100×300 pixels, the second threshold can be activated to control the window's functionality, as will be described below.

At step 204, different functional aspects to be executed with respect to each size threshold corresponding to the window are defined. As will be described in greater detail below, the functional aspects defined for each size threshold are used such that when each of the defined size thresholds is crossed, the functionality in the window dynamically changes based on the functional aspects associated with the crossed size threshold. For example, functional aspects defined for a specific size threshold may allow for viewing data via a window in a specific format and may allow a user to manipulate the data using a set of functional operations associated with the specific size of the window corresponding to the threshold. Then, functional aspects defined for a different size threshold may trigger a display format that allows a user to manipulate the displayed data using a different set of functional operations. In other words, the functionality aspects may define different window contents as well as different functional ways to interact with the displayed content. For example, a size threshold corresponding to a smaller window may be associated with an interface that provides more compact functionality as compared to a size threshold corresponding to a larger window.

According to one example embodiment, the functionality linked to each size threshold may be controlled by the same application that provides functionally different views or interfaces. Alternatively, some functional aspects may come from one application, while others may be linked to functional aspects provided by one or more other applications via plug-ins or yet some other linking methods.

At step 206, a window having a default size and a default functionality is displayed on a screen. According to one example embodiment, the default functionality is determined by an application that creates the window. According to an alternative embodiment, both default size and functionality may be user configurable.

At step 208, it is determined whether one of the defined size thresholds has been detected. As described earlier, the size threshold is based on a window's size. Thus, when a user increases/decreases the window's size such that the next size threshold is reached, a new size threshold is detected. According to one example embodiment, the window can be resized manually by a user dragging the size control of the window, such as the lower-right corner of the window, or yet some other corner or border of the window, to a desired location on a screen. Alternatively, a user may enter a predefined resize command, such as a selection of a predefined key on a keyboard, and the resize command may cause the window to be resized to a preset size based on the resize command. It should be understood that the content/functionality of the window may scale accordingly with the window as the window is being resized up to the point when the next size threshold is reached, at which time the functionality changes based on the predefined functionality. If the next size threshold is not crossed, the method continues at 206, and the functionality associated with the window remains the same, except that the window's content may be resized as the window is being resized.

When another size threshold is reached, at step 210, the functional aspects predefined for the detected size threshold are dynamically applied to the window. As explained earlier, the presentation of the displayed data may change and different functional ways for interacting with the displayed data may be provided along with the resized window. It should be understood that either the application corresponding to the default functionality of the window or a different application may control the functionality of the window as well as the format of data displayed via the window when another size threshold is detected.

Figure 3:
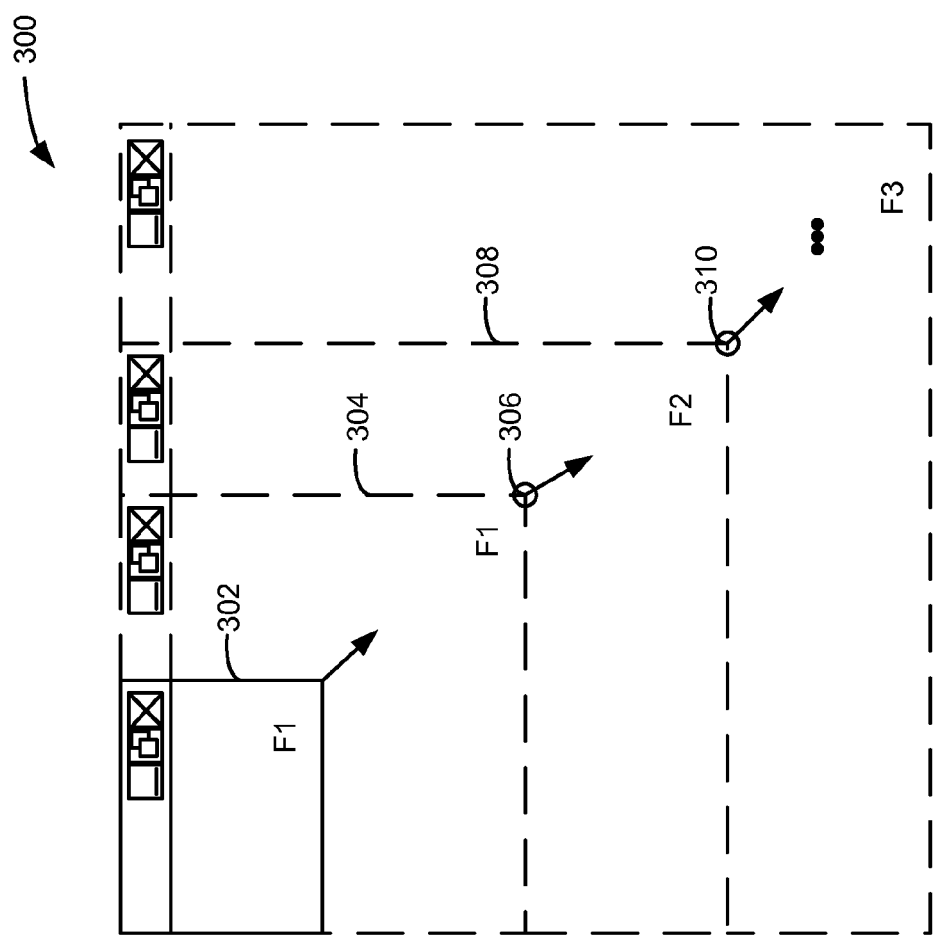
FIG. 3 is a block diagram illustrating an example screen and a process of resizing a window and activating different functionality based on the window's size.

FIG. 3 is a block diagram that illustrates an example screen 300 and a process of resizing a window and activating different functional aspects for the window based on the window's size. The example screen 300 is associated with three functional states and two window size thresholds; however, it should be understood that fewer or more functional states and window size threshold could be used as well. When a user selects a window to be resized, here a window 302, the window 302 is associated with a certain functional state ("F1"). The window 302 may be resized by entering a resize command or using a cursor to drag a boundary of the window, such as the lower right corner of the window 302, to a desired location, thus effectively resizing the window 302. While resizing illustrated in FIG. 3 changes the x-dimension and the y-dimension of the window 302, it should be understood that only the x-dimension or the y-dimension could be modified and may result in activation of the preset threshold size triggers.

As the window 302 is being resized, the functional state (F1) controls until another size threshold is reached, as illustrated with the corner of the window reaching a marker 306. When the threshold is reached such that the window's size matches or crosses the size corresponding to the window 304, the first size threshold triggers a change in the functional state of the window so that another functional state ("F2") is activated. The functionality F2 controls until another size threshold is reached, indicated with a marker 310 and a window 308. In other words, the functionality F2 controls as long as the window's size falls between the sizes corresponding to the windows 304 and 308. When resizing results in the window's size 308, another size threshold is reached and activates the functional state ("F3"). As mentioned earlier, additional functional states based on additional window size thresholds could be used as well, and the embodiment illustrated in FIG. 3 is only an example.

A. Trading Environment Example

While there are many different environments in which the example embodiments can be applied, one example application will be described in relation to an electronic trading environment.

Electronic trading refers to a trading system that matches orders by an electronic platform. Current examples of electronic trading platforms include the Chicago Mercantile Exchange ("CME") Globex® trading system, the Chicago Board of Trade ("CBOT"), and Eurex, just to name a few. A trading system that matches orders electronically is also often referred to as an "electronic exchange." Exchanges like the CME and CBOT currently offer trading via open outcry in addition to electronic trading.

Electronic trading is generally based on a host exchange, one or more computer networks and client devices. In general, the host exchange includes one or more centralized computers to form the electronic heart. The exchange allows a trader to participate in trading at least one tradable object, and conducts matching of bids and offers that are placed by the subscribing traders for that tradable object. Typically, subscribing traders connect to an exchange by way of a communication link or through an application programming interface to establish real-time electronic messaging between the exchange and their terminals.

As used herein, the term "tradable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradable object may be "real," such as products that are listed by an exchange for trading, or "synthetic," such as a combination of real products that is created by the user. A tradable object could actually be a combination of other tradable objects, such as a class of tradable objects.

An electronic exchange can list any number of tradable objects for trading. Often times, traders will simultaneously trade more than one tradable object, and they may simultaneously trade tradable objects that are listed at more than one exchange. Ordinarily, each tradable object has its own separate stream of market information that commonly includes the inside market and market depth. The inside market is the lowest sell price in the market and the highest buy price in the market at a particular point in time. Market depth refers to quantities available at the inside market and may also refer to quantities available at other prices away from the inside market.

Traders link to an electronic exchange through a computer network. Then, using a front-end trading system, traders can participate in the electronic markets offered by these electronic exchanges. Electronic exchanges or independent companies like Trading Technologies® develop, deploy, and support front-end electronic trading systems that allow traders to access various electronic exchanges. Some of Trading Technologies® products include XTRADER®, X_STUDY™, X_RISK®, and X_TRADER® API.

Traders interact with electronic exchanges using trading screens. Trading screens allow traders to view market information as well as any news or any other interfaces provided by many different applications, such as charting applications, that traders can use to make their trading actions. Upon viewing the provided information, traders may use trading interfaces to take certain actions including the actions of sending buy or sell orders to one or more electronic exchanges, adjusting existing orders, deleting orders, or otherwise managing orders. Traders often use software tools on their client devices to automate those and additional actions.

In many instances, spotting an opportunity in the market and capitalizing on the opportunity before the market moves or before a competing trader does can separate the traders who are successful from the ones who are not. Trading schemes often require monitoring of market information related to multiple tradable objects, as well as monitoring of news and charts via separate interfaces. An important component in capitalizing on opportunities involves quickly assimilating information and then acting on that information to get the order to the exchange for matching before other traders do. In many instances, the size of a trading screen limits the number of windows or the amount of information that can be simultaneously displayed to a trader. As the number of tradable objects being traded by a trader increases, the ability of the trader to quickly access and view desired information will be therefore further reduced. Additionally, navigation between windows and opening additional windows that provide different functional views of the same or different data takes time and cuts into time that a trader could spend analyzing desired data or submitting orders.

Thus, having a window that responds to resizing events with a multiplicity of functional states would be beneficial to many traders in an electronic trading environment. According to one example embodiment, when a trader resizes a window, the trader can access different functional ways of interacting with market data related to one or more tradable objects. For example, as will be described in greater detail below, as a trader makes a window smaller, the trader may swap out one functionality for different functionality, and vice versa. Thus, the example embodiments not only assist a trader in window management but also increase efficiency of the screen real-estate.

Figure 4A:
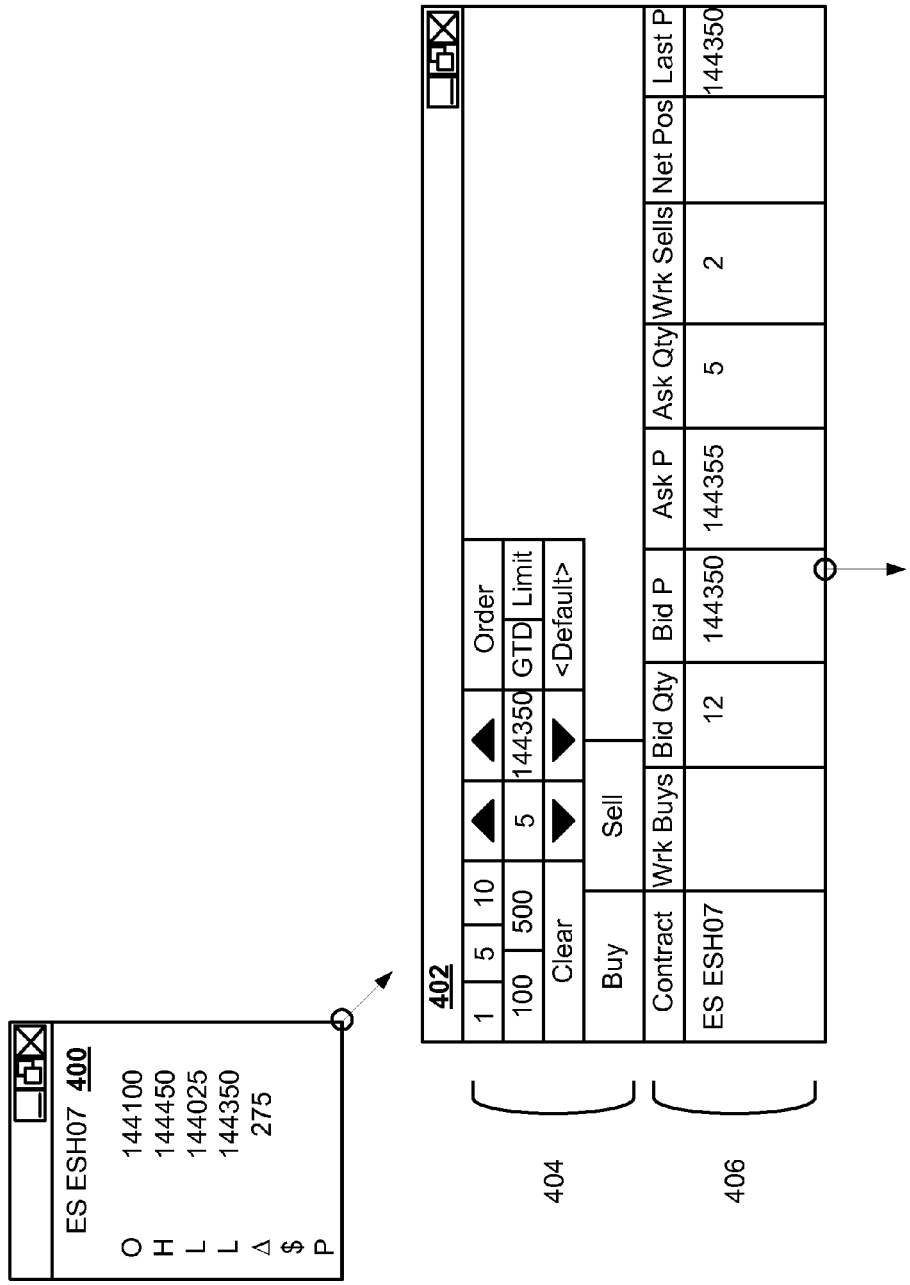
FIGS. 4A and 4B illustrate an example of four sizing thresholds and the corresponding functionally different interfaces for viewing and interacting with market data in an electronic trading environment.
Figure 4B:
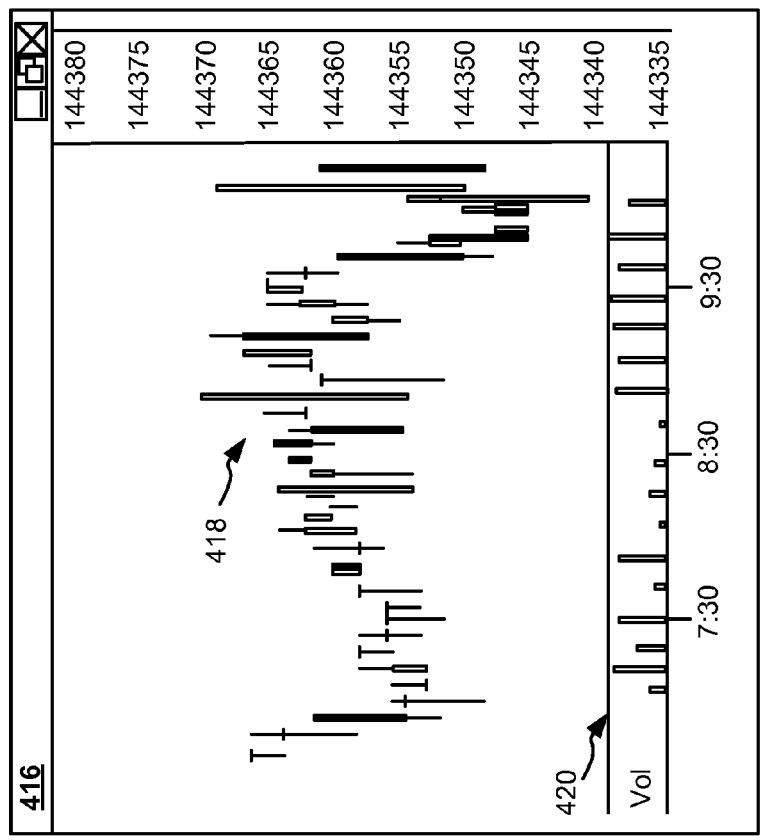

FIGS. 4A and 4B are block diagrams that provide an example of four sizing thresholds and corresponding functionally-different interfaces for viewing and interacting with market data related to a tradable object. While FIGS. 4A and 4B illustrate four functional states defined for four size thresholds, it should be understood that more or fewer threshold triggers as well as functional states could be defined as well.

According to one example embodiment, a user may first activate a quote board type display that may be set to correspond to the first functional view of a tradable object. The quote board cell displays market data corresponding to a tradable object 'ES ESH7.' The quote board 400 displays a plurality of fields corresponding to the tradable object. The fields include an opening price for a day field 'O,' a high price for a day field 'H,' a low price for a day 'L,' a last traded price 'L,' a net change on the day 'Δ,' a net position for a tradable object '$,' and a profit/loss level ("P/L") for a tradable object calculated based on the last traded price 'P' or an ask/bid price 'AP' and 'BP.' It should be understood that the data displayed via the quote board cell is dynamically updated based on market updates provided by an electronic exchange so that a trader may use the quote board cell 400 to get a up to date overview of the market for a given tradable object. It should be understood that different or additional data could be displayed in relation to the quote board cell 400 as well. For example, the quote board cell 400 could display the most recent ask/bid quantity, current volume, as well as other data types selected based on the trader's preferences.

When the window 400 is resized such that it crosses another size threshold, the functionality of the window changes as shown at 402. The window 402 illustrates a market display that can be used by a trader to not only view some market data parameters corresponding to the tradable object, but also to enter orders to buy or sell the tradable object at an electronic exchange. The market display is composed of two panes: an order entry pane 404 and a market grid pane 406.

The order entry pane 404 has a number of preset fields and buttons that allow a trader to enter orders to buy or sell the tradable object. The order entry pane 404 includes quantity buttons ('1,' '5,' '10,' etc.), located in the upper left-hand corner, that allow a trader to increase and decrease an order quantity by a default value when a user right or left clicks in a quantity field, here displaying a quantity of '5,' illustrated to the right of the quantity buttons. A price field, with a price set to '144350' is displayed to the right of the quantity field. Then, 'Buy' and 'Sell' buttons are used to define if an order is a 'buy' or a 'sell' and to send the order to the electronic exchange. Additionally, the order entry pane 404 includes a number of fields that enable a trader to select an order type for an order to be submitted to an electronic exchange. The illustrated order types include Good 'Til Day ("GTD") and Limit ('Limit') order types. The 'None' tab provides a list of additional order types, and the 'Default' tab enables a trader to select an account that a user wishes to use for trading. It should be understood that, while not illustrated, additional order entry tabs could be displayed as well depending on the user's preferences or the configuration of the order entry pane 404.

Figure 4B:
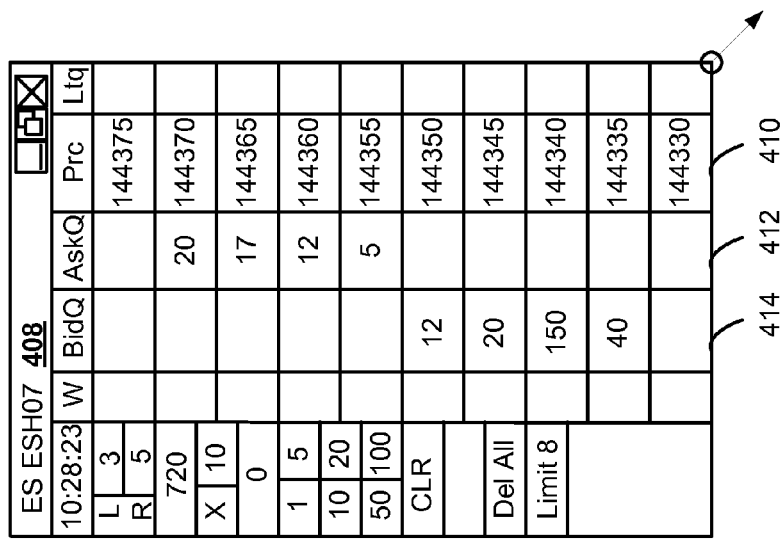

The market grid pane 406 displays real time market data related to the tradable object 'ES ESH7.' While the example illustrated in FIG. 4 shows only data corresponding to the tradable object 'ES ESH7,' it should be understood that real time data corresponding to additional tradable objects could be displayed via the market grid pane 406 as well. The market information illustrated via the market grid pane 406 includes a 'Wrk Buys' column that reflects the total number of working buys that a user has pending for the tradable object, and a 'Bid Q' column that reflects a bid quantity pending at the highest bid price listed in a "Bid P" column. Then, the 'Ask P' column lists the best ask price, and the 'Ask Q' column lists an ask quantity pending at the best ask price. The 'Wrk Sells' column reflects the total number of working sell orders that a user has pending for the tradable object. Then, the 'Net Pos' field lists a net position for the tradable object, and the "Last P" field lists the last traded price. It should be understood that additional or fewer columns having additional or fewer parameters could also be displayed via the market grid pane 406. Also, as new market data is received for the tradable object from the electronic exchange, the values displayed via the market grid pane 406 are dynamically updated to reflect current market conditions.

When a user increases the size of the market display window 402 such that the window 402 reaches the next size threshold, the functional state of the window once again changes. According to one example embodiment, the third functional state allows a trader to interact with the market data using another interface. FIG. 4B illustrates the third functional state defined for the window. More specifically, the third functional state corresponds to an interface 408 that is an electronic trading interface of the MD-TRADER™ style display from Trading Technologies International, Inc. of Chicago, Ill. The interface 408 includes a value axis 410 that indicates values representing prices or some other derivative of price, such as yield, determined for a tradable object, here, once again, the tradable object 'ES ESH7.' The prices or some other derivative of price for the tradable object are determined based on market data received from the electronic exchange. While the values in the value axis are displayed along a vertically oriented axis, different orientations for the value axis could be used as well.

The interface also includes an ask quantity column 412 and a bid quantity column 414 that display ask and bid quantities, respectively. The bid and ask quantities are displayed in locations corresponding to their respective values, e.g., price levels along the axis 410. By looking at the trading interface 408, the trader can quickly locate the inside market, which refers to the highest bid price and the lowest ask price currently available in the market. Further, using the interface 408, a user can view how much quantity is available at various price levels away from the inside market, thus giving a trader a more detailed view of market conditions corresponding to the tradable object. The interface 408 also shows additional parameters such as working order indicators, total traded quantity, a last traded quantity indicator, and many others. Also, the interface 408 allows a trader to enter orders at desired price levels by selecting locations corresponding to desired price levels to send orders having a preset default quantity to an electronic exchange. Various additional aspects of the interface 408 shown in FIG. 4B are described in U.S. Pat. No. 6,772,132 and U.S. Pat. No. 6,766,304, the entire content of which is incorporated herein by reference.

When a user increases the size of the interface window 408 such that the window 408 reaches the next size threshold, the functional state of the window once again changes to provide yet another way to view and interact with the market data corresponding to the tradable object. FIG. 4B illustrates the fourth functional state defined for the window. In the embodiment illustrated in FIG. 4B, the fourth functional state corresponds to a chart study interface 416 that displays historical market data corresponding to the tradable object 'ES ESH7'. The chart study interface 416 displays a chart 418 along a time axis and a price axis. While the interface 416 displays a single candle-stick chart, it should be understood that more complex charts corresponding to more than one tradable object could be displayed as well. Additionally, the example embodiments are not limited to displaying any specific chart types. For example, the chart could be a line chart, a bar chart, or yet some other chart type. Also, rather than or in addition to the displayed chart, the interface 416 could also display different information, such as a market profile for the tradable object, to assist a trader in analyzing market trends. A market profile is a statistical display of price activity over a specified time period. Different market trend analysis interfaces could be used as well. The interface 416 also displays traded volume data at 420 that may assist a trader in analyzing the market.

While FIGS. 4A and 4B illustrate four example functional states defined for a window for use in an electronic trading environment, it should be understood that fewer or additional size thresholds could be defined as well, and the defined size thresholds could trigger activation of a different set of displays/interfaces. Additionally, while the example embodiments focused on size thresholds that were detected upon a window progressively increasing in size, it should be understood that the size thresholds could be defined based on a window decreasing in size as well. It should be understood that the example embodiments are not limited to any specific set of interfaces/displays. Also, the example embodiments are not limited to the use in trading environment and could be applied in other environments as well, as is described below.

B. Network Monitor Example

According to another example embodiment, the window sizing thresholds and different functional states corresponding to resized windows may be applied in a network administration environment. As known, network administrators deploy, configure, provide maintenance, and monitor active network gear, such as switches, routers, firewalls, servers, gateways, etc. System administrators also ensure that the prescribed service-quality objectives are met and therefore it is critically important to them to know of any problems occurring in their networks as soon as the problems arise. Some networks, such as trading environment networks, may span across the world, with gateways, servers, routers, and switches being located in many different locations, such as cities or even counties. In such environments, while a system administrator may wish to view the overall status of the networks, it would be beneficial to provide an interface that allows the administrator to quickly get to the source of any existing problem without the need to open many separate interfaces.

FIGS. 5A-5C illustrate block diagrams that provide an example of two window size thresholds and functionally different interfaces for monitoring network activity.

FIG. 5A is a block diagram illustrating a window 500 including two graphical indicators 502 and 504. According to one example embodiment, the indicators are color-coded to indicate the overall status of a preconfigured set of network components, including specific hardware entities as well as communication links. In one embodiment, the top indicator 502 is color-coded red to indicate that there are some problems with the overall network status, and the bottom indicator 504 is color-coded green to indicate that there are no significant network problems demanding immediate attention.

To illustrate an example embodiment for monitoring network activity, it is assumed that the indicator 502 is red, thus, indicating an alert network status. As previously described in greater detail, a user may resize the window 500 to activate the next functional state, as shown in FIG. 5B. The window 506 in FIG. 5B illustrates a more detailed view of network activity. More specifically, the window 506 includes three sets of status indicators corresponding to networks in three separate locations, here, Chicago ("Chi"), New York ("NY"), and London. The network status corresponding to each location is illustrated via a separate window, as illustrated at 508, 510, and 512. As shown in relation to the window 508, the top indicator is color-coded to indicate an alert state for Chicago network. A user may then resize the window 508, as shown in FIG. 5B, to obtain additional details about Chicago network. When the next size threshold is reached, the functionality of the window 508 changes, and a new window 514 shown in FIG. 5C is activated. Using the window 514, a user may view specific details corresponding to the problems detected with respect to Chicago network.

C. Additional Embodiments

While a few example embodiments have been described above, it should be understood that changing the window's functionality based on size thresholds could be used in many different environments. For example, the example embodiments could be applied in relation to business environments, such as systems that measure progress and status of an organization. According to one example embodiment, the first window can display one or more visual indicators associated with an overall key performance indicator ("KPI") or a key success indicators ("KSI") for a business organization. As commonly known, KPIs or KSIs are quantifiable measurements that reflect the critical success factors of an organization. It should be understood that the definition of KPIs may vary depending on the type of the organization. For example, the overall KPI may be based on data from many different sources, such as profit measurements, sales, customer service, etc.

Similarly to the embodiments illustrated in FIGS. 5A-5C, the overall KPI may be indicated using two or more indicators that give a user a quick overview of the status of an organization. Then, a user could expand the first window to a first size threshold to view more detailed data, such as a KPI for each department of an organization. When the next size threshold is reached, additional details could be provided, such as specific reports associated with KPIs that indicate problematic activity. Different embodiments are possible as well.

According to one embodiment, the example system takes the form of a computer program product that is stored on a computer readable storage medium and is executed by a suitable instruction execution system in the computer-based device. The term computer readable medium, as used herein, refers to any medium that participates in providing instructions to processor for execution. Such a medium may take many forms, including but not limited to, non-volatile media, volatile media, and transmission media. Nonvolatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

According to an alternative embodiment, a hardware embodiment might take a variety of different forms. A hardware embodiment may be implemented as an integrated circuit with custom gate arrays or an application specific integrated circuit ("ASIC"). A hardware embodiment may also be implemented with discrete hardware components and circuitry. In particular, it is understood that the logic structures and method step described in the flow diagrams may be implemented in dedicated hardware such as an ASIC, or as program instructions carried out by a microprocessor or other computing device. It will be apparent to those of ordinary skill in the art that the methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed:

1. A non-transitory computer readable medium having stored therein instructions executable by a processor, wherein the instructions are executable to:
   define a plurality of size thresholds associated with a plurality of functional states to be used in relation to a window, wherein each functional state is associated with a different display type and a different functional method for interacting with displayed data;
   provide a first functional state in relation to the window having a first size that is associated with a first size threshold of the plurality of thresholds, the first functional state configured to display a data using a first display type, the first display type associated with a first functional method for interacting with the displayed data, wherein the data comprises market data associated with a tradable object, wherein the first display type comprises a quote board display for displaying the market data;
   resize the window such that the size of the window crosses a second size threshold of the plurality of size thresholds; and
   dynamically apply to the window a second functional state corresponding to the second size threshold, wherein the second functional state is configured to display the data using a second display type that is different than the first display type, the second display type associated with a second functional method for interacting with the displayed data, wherein the second display type comprises a market display window for displaying the market data and for sending orders to buy or sell the tradable object.

2. The computer readable medium of claim 1, wherein the first display type and the second display type are provided by an application.

3. The computer readable medium of claim 1, wherein the first display type and the second display type are provided by different applications.

4. The computer readable medium of claim 1, wherein the instruction to resize the window are executable upon detecting a user initiated command.

5. The computer readable medium of claim 1, wherein the instructions to resize the window are further executable to automatically resize the window upon detecting a preconfigured event.

6. The computer readable medium of claim 1, wherein the tradable object is being traded at an electronic exchange.

7. The computer readable medium of claim 6, wherein the instructions are further executable to:
   dynamically update the market data related to the tradable object as new market data is received from the electronic exchange.

8. The computer readable medium of claim 1, wherein the plurality of size thresholds and the plurality of functional states corresponding to the window are user-defined.

9. The computer readable medium of claim 1, wherein the instructions are further executable to:
   as the size of the window is being changed to reach the second size threshold, scale content of the window associated with the first state.

10. The computer readable medium of claim 1, wherein the second size threshold is associated with the window having a larger size than a size associated with the first size threshold.

11. The computer readable medium of claim 1, wherein the second size threshold is associated with the window having a smaller size than a size associated with the first size threshold.

12. A non-transitory computer readable medium having stored therein instructions executable by a processor, wherein the instructions are executable to:
define a plurality of size thresholds associated with a plurality of functional states to be used in relation to a window, wherein each functional state is associated with a different display type for displaying a market data for a tradable object being traded at an electronic exchange, each functional state further associated with a different functional method for interacting with the market data displayed via each display type;
display the market data for the tradable object using a first display type associated with a first size threshold of the plurality of size thresholds, the first display type associated with a first functional state having a first functional method for interacting with the market data associated with the tradable object, wherein the first display type comprises a market display window for displaying the market data and for sending orders to buy or sell the tradable object;
resize the window such that a size of the window crosses a second size threshold of the plurality of size thresholds; and
dynamically change the first functional state to a second functional state associated with the second size threshold, wherein the second functional state is configured to display the market data using a second display type that is different than the first display type, the second display type associated with a second functional method for interacting with the displayed market data, wherein the second display type comprises a trading interface for displaying the market data along an axis and for sending an order to buy or sell the tradable object at a price by selecting a location of a plurality of locations along the axis.

13. The computer readable medium of claim 12, wherein the first display type and the second display type are provided by an application.

14. The computer readable medium of claim 12, wherein the first display type and the second display type are provided by different applications.

15. The computer readable medium of claim 12, wherein the instruction to resize the window are executable upon detecting a user initiated command.

16. The computer readable medium of claim 12, wherein the instructions to resize the window are further executable to automatically resize the window upon detecting a preconfigured event.

17. The computer readable medium of claim 16, wherein the preconfigured event is based on market data related to the tradable object.

18. The computer readable medium of claim 12, wherein the instructions are further executable to:
dynamically update the displayed data related to the tradable object as new market data is received from the electronic exchange.

19. The computer readable medium of claim 12, wherein the second size threshold is associated with the window having a larger size than a size associated with the first size threshold.

20. The computer readable medium of claim 12, wherein the second size threshold is associated with the window having a smaller size than a size associated with the first size threshold.

21. A non-transitory computer readable medium having stored therein instructions executable by a processor, wherein the instructions are executable to:
define a plurality of size thresholds associated with a plurality of functional states to be used in relation to a window, wherein each functional state is associated with a different display type and a different functional method for interacting with displayed data;
provide a first functional state in relation to the window having a first size that is associated with a first size threshold of the plurality of thresholds, the first functional state configured to display a data using a first display type, the first display type associated with a first functional method for interacting with the displayed data, wherein the data comprises market data associated with a tradable object, wherein the first functional state comprises a trading interface for displaying the market data along an axis and for sending an order to buy or sell the tradable object at a price by selecting a location of a plurality of location along the axis;
resize the window such that the size of the window crosses a second size threshold of the plurality of size thresholds; and
dynamically apply to the window a second functional state corresponding to the second size threshold, wherein the second functional state is configured to display the data using a second display type that is different than the first display type, the second display type associated with a second functional method for interacting with the displayed data, wherein the second display type comprises a chart.

22. The computer readable medium of claim 21, wherein the first display type and the second display type are provided by an application.

23. The computer readable medium of claim 21, wherein the first display type and the second display type are provided by different applications.

24. The computer readable medium of claim 21, wherein resizing the window comprises manually resizing the window by a user dragging a boundary of the window.

25. The computer readable medium of claim 21, wherein the instruction to resize the window are executable upon detecting a user initiated command.

26. The computer readable medium of claim 21, wherein the instructions to resize the window are further executable to automatically resize the window upon detecting a preconfigured event.

27. The computer readable medium of claim 26, wherein the preconfigured event is based on market data related to the tradable object.

28. The computer readable medium of claim 21, wherein the instructions are further executable to:
dynamically update the displayed data related to the tradable object as new market data is received from the electronic exchange.

29. The computer readable medium of claim 21, wherein the second size threshold is associated with the window having a larger size than a size associated with the first size threshold.

30. The computer readable medium of claim 21, wherein the second size threshold is associated with the window having a smaller size than a size associated with the first size threshold.

* * * * *